United States Patent
Eguchi et al.

(10) Patent No.: US 12,122,634 B2
(45) Date of Patent: Oct. 22, 2024

(54) MEDIUM FEEDING APPARATUS, IMAGE READING APPARATUS, AND MEDIUM FEEDING METHOD

(71) Applicant: Seiko Epson Corporation, Tokyo (JP)

(72) Inventors: Seiji Eguchi, Kitakyushu (JP); Takayuki Shiota, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 358 days.

(21) Appl. No.: 17/558,739

(22) Filed: Dec. 22, 2021

(65) Prior Publication Data

US 2022/0204294 A1 Jun. 30, 2022

(30) Foreign Application Priority Data

Dec. 24, 2020 (JP) ................. 2020-215278

(51) Int. Cl.
*B65H 7/12* (2006.01)
*B65H 1/06* (2006.01)
(Continued)

(52) U.S. Cl.
CPC ............. *B65H 7/12* (2013.01); *B65H 1/06* (2013.01); *H04N 1/00602* (2013.01);
(Continued)

(58) Field of Classification Search
CPC ... B65H 7/12; B65H 1/06; B65H 5/06; B65H 2511/12; H04N 1/00602; H04N 1/0071;
(Continued)

(56) References Cited

U.S. PATENT DOCUMENTS 6,724,506 B1 * 4/2004 Wang ................. H04N 1/00644
  271/110
8,708,327 B2 * 4/2014 Suzuki ................... B65H 3/063
  271/130

(Continued)

FOREIGN PATENT DOCUMENTS

JP  2019-026393  2/2019
JP  2019-064790  4/2019

(Continued)

*Primary Examiner* — Thomas A Morrison
(74) *Attorney, Agent, or Firm* — WORKMAN NYDEGGER

(57) ABSTRACT

A medium feeding apparatus includes a medium mounting section forming a mounting face for mounting a medium thereon, a feeding roller configured to feed a lowermost medium among mediums mounted on the medium mounting section in a feeding direction, and a movement detection unit configured to output information related to movement of the medium in a direction along the mounting face, wherein based on detection information detected by a medium height detection unit that outputs information related to a height of the medium mounted on the mounting section from the mounting face in abnormality detection processing, when the height is less than a first threshold value, a control unit continues feeding the medium regardless of detection information detected by the movement detection unit or without obtaining detection information detected by the movement detection unit.

8 Claims, 11 Drawing Sheets

(51) Int. Cl.
  *H04N 1/00*    (2006.01)
  *B65H 5/06*    (2006.01)

(52) U.S. Cl.
  CPC ....... *H04N 1/0071* (2013.01); *H04N 1/00716* (2013.01); *H04N 1/00737* (2013.01); *H04N 1/00777* (2013.01); *H04N 1/00795* (2013.01); *B65H 5/06* (2013.01); *B65H 2511/12* (2013.01)

(58) Field of Classification Search
  CPC ........... H04N 1/00716; H04N 1/00737; H04N 1/00777; H04N 1/00795
  See application file for complete search history.

(56) References Cited

U.S. PATENT DOCUMENTS

| | | |
|---|---|---|
| 2019/0100396 A1 | 4/2019 | Shiota et al. |
| 2020/0198908 A1* | 6/2020 | Shimosaka .......... B65H 3/0661 |

FOREIGN PATENT DOCUMENTS

| | | |
|---|---|---|
| JP | 2020-033144 | 3/2020 |
| JP | 2021-083051 | 5/2021 |

\* cited by examiner

MEDIUM FEEDING APPARATUS, IMAGE READING APPARATUS, AND MEDIUM FEEDING METHOD

The present application is based on, and claims priority from JP Application Serial Number 2020-215278, filed Dec. 24, 2020, the disclosure of which is hereby incorporated by reference herein in its entirety.

BACKGROUND

1. Technical Field

The present disclosure relates to a medium feeding apparatus that feeds a medium, and an image reading apparatus including the medium feeding apparatus. The present disclosure also relates to a medium feeding method in a medium feeding apparatus.

2. Related Art

Image reading apparatuses and recording apparatuses are provided with a medium feeding apparatus that feeds a medium. When a medium is fed, a feeding abnormality, such as skewing of the medium, and the like sometimes occur. Techniques for detecting such a feeding abnormality are known. JP-A-2019-026393 discloses a sheet feeding apparatus including a mounting section on which a sheet is mounted, a feeding section that feeds a sheet mounted on the mounting section, a separation section that separates sheets one by one from the feeding section, and a movement detection section that detects movement of the sheet on the mounting section.

The sheet feeding apparatus disclosed in JP-A-2019-026393 has a configuration in which a tracking type optical sensor is employed in the movement detection section. With the tracking type optical sensor, a light source radiates light onto a document, the reflected light from the document is received by an imaging section at a predetermined sampling period to obtain an image, and the movement of a tracking target area included in the image is tracked. The movement amount or the movement direction of the document is detected based on the tracking result. Next, changes in the document image are tracked by capturing the images of the lowermost document that has moved after starting separation feeding, and the changes of the document image are detected as movement of the document during separation so as to determine a separation abnormality pattern. As a result, when the movement direction of the image area differs from a reference direction, the document is determined as having skewed. When the movement of the image area includes a rotational component or in a state that is neither a skew abnormality nor a non-feed abnormality, or the like, a determination is made that a staple abnormality in which a document bound with a staple, or the like is going to be separated, or the like occurs.

The tracking type optical sensor described in JP-A-2019-026393 outputs a correct detection value in a state in which a document is in close proximity to the optical sensor. However, when the document rises from the optical sensor, the reliability of the detection value deteriorates. As a result, although no feeding abnormality has occurred, a feeding abnormality is mistakenly determined so that the feeding of the document is stopped. This causes a user to perform useless operation.

SUMMARY

According to an aspect of the present disclosure, there is provided a medium feeding apparatus including: a medium mounting section forming a mounting face for mounting a medium thereon; a feeding roller configured to feed a lowermost medium among mediums mounted on the medium mounting section in a feeding direction; a movement detection unit disposed, at a position opposing the lowermost medium among the mediums mounted on the medium mounting section, upstream of the feeding roller in the feeding direction and configured to output information related to movement of the medium in a direction along the mounting face; and a control unit configured to perform abnormality detection processing for determining a feeding abnormality when movement of the medium after starting feeding the medium exceeds a permissible range based on information obtained from the movement detection unit, wherein a medium height detection unit that outputs information related to a height of the medium mounted on the medium mounting section from the mounting face is disposed, and when the height is less than a first threshold value based on detection information detected by the medium height detection unit in the abnormality detection processing, the control unit continues feeding the medium regardless of detection information detected by the movement detection unit or without obtaining detection information detected by the movement detection unit.

According to another aspect of the present disclosure, there is provided a medium feeding method in a medium feeding apparatus including a medium mounting section forming a mounting face for mounting a medium thereon, a feeding roller configured to feed a lowermost medium among mediums mounted on the medium mounting section in a feeding direction, and a movement detection unit disposed, at a position opposing the lowermost medium among the mediums mounted on the medium mounting section, upstream of the feeding roller in the feeding direction and configured to output information related to movement of the medium in a direction along the mounting face, the medium feeding method including: in abnormality detection processing for determining a feeding abnormality when movement of the medium after starting feeding the medium exceeds a permissible range based on information obtained from the movement detection unit, based on detection information detected by the medium height detection unit that outputs information related a height of the medium mounted on the medium mounting section from the mounting face, when the height is less than a first threshold value, continuing feeding the medium regardless of detection information detected by the movement detection unit or without obtaining detection information detected by the movement detection unit.

DESCRIPTION OF EXEMPLARY EMBODIMENTS

Figure 1:
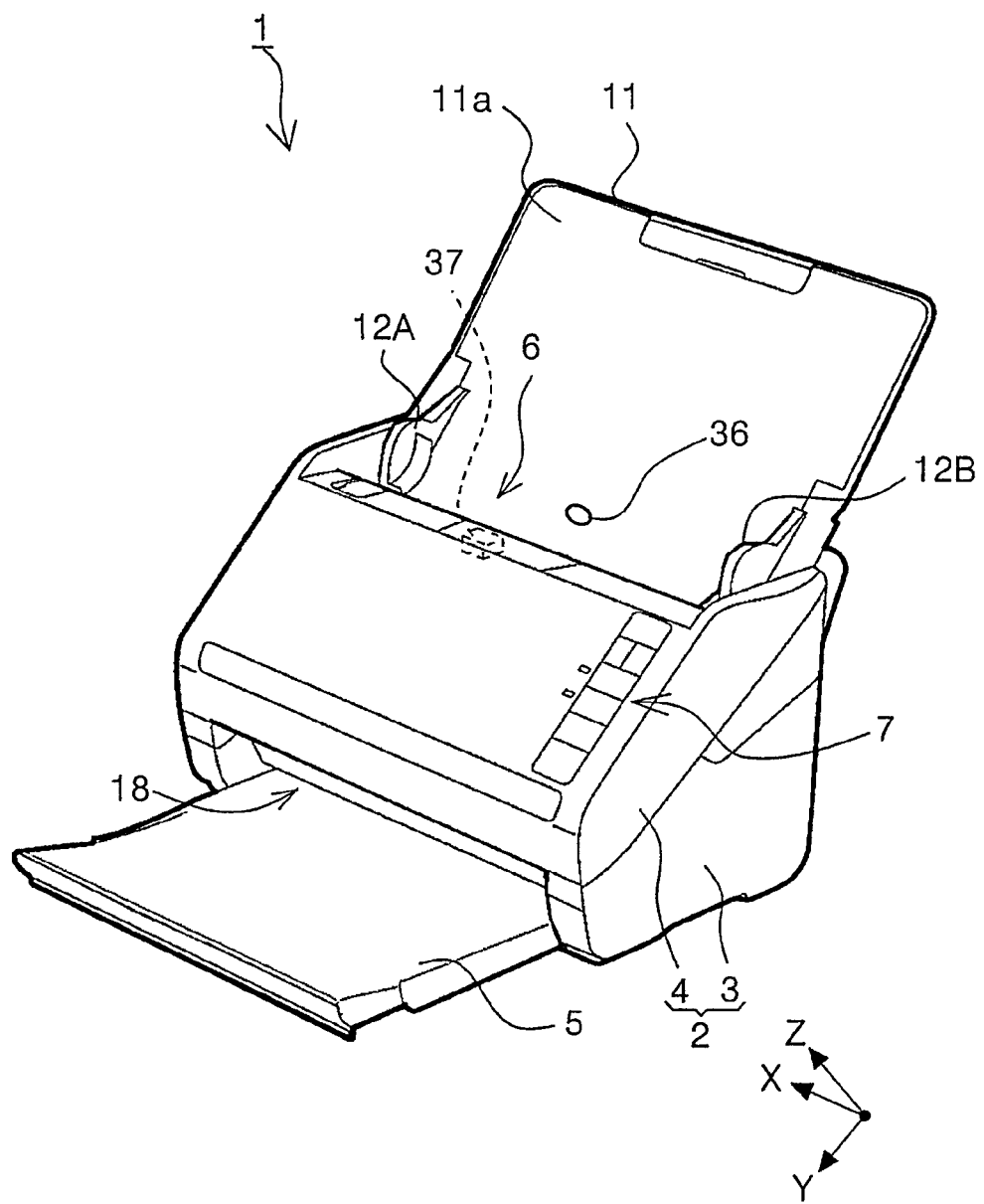
FIG. 1 is an outer perspective view of a scanner.

In the following, a schematic description will be given of the present disclosure. According to a first aspect of the present disclosure, there is provided a medium feeding apparatus including: a medium mounting section forming a mounting face for mounting a medium thereon; a feeding roller configured to feed a lowermost medium among mediums mounted on the medium mounting section in a feeding direction; a movement detection unit disposed, at a position opposing the lowermost medium among the mediums mounted on the medium mounting section, upstream of the feeding roller in the feeding direction and configured to output information related to movement of the medium in a direction along the mounting face; and a control unit configured to perform abnormality detection processing for determining a feeding abnormality when movement of the medium after starting feeding the medium exceeds a permissible range based on information obtained from the movement detection unit, wherein a medium height detection unit that outputs information related to a height of the medium mounted on the medium mounting section from the mounting face is disposed, and when the height is less than a first threshold value based on detection information detected by the medium height detection unit in the abnormality detection processing, the control unit continues feeding the medium regardless of detection information detected by the movement detection unit or without obtaining detection information detected by the movement detection unit.

When a medium rises from the movement detection unit, the reliability of the detection value detected by the movement detection unit might deteriorate. Such a problem is more likely to occur as the amount of mounted mediums decreases, in other words, as the height of the mediums mounted on the medium mounting section from the mounting face is lower. Thus, in this aspect, when the height is less than a first threshold value, the control unit continues feeding the medium based on detection information detected by the medium height detection unit in the abnormality detection processing regardless of detection information detected by the movement detection unit or without obtaining detection information detected by the movement detection unit. Accordingly, it is possible to prevent stopping feeding the medium by mistakenly determining that a feeding abnormality has occurred although no feeding abnormality has occurred.

According to a second aspect, in the first aspect, when the control unit starts feeding a medium, the control unit may obtain an initial value of the height based on detection information detected by the medium height detection unit, and when a variation from the initial value of the height exceeds a second threshold value, the control unit may stop feeding the medium based on the detection information detected by the medium height detection unit in the abnormality detection processing.

When mediums are set in a bound state and fed, particularly when mediums are fed in a state bound at a corner upstream in the feeding direction, in a case in which the lowermost preceding medium is fed, only the back end of the subsequent medium is moved downstream with the preceding medium. Thereby, the subsequent medium rises upward. In this regard, it is assumed that the abnormality that occurs with feeding a medium in the state in which the mediums are bound at a corner upstream in the feeding direction is referred to as a "back-end binding abnormality". With this aspect, when the control unit starts feeding the medium, the control unit obtains an initial value of the height based on detection information detected by the medium height detection unit, and when a variation from the initial value of the height exceeds the second threshold value based on the detection information detected by the medium height detection unit in the abnormality detection processing, the control unit stops feeding the medium. Accordingly, it is possible to suppress a damage that occurs by detecting a back-end binding abnormality and stopping feeding the medium. Also, with this aspect, presence or absence of a back-end binding abnormality is determined based on a variation from the initial value of the height, and thus it is possible to suitably determine presence or absence of a back-end binding abnormality regardless of the amount of mounted mediums.

According to a third aspect, in the first aspect, when the height exceeds a second threshold value higher than the first threshold value, the control unit may stop feeding the medium based on detection information detected by the medium height detection unit in the abnormality detection processing. With this aspect, in the same manner as the second aspect, it is possible to suppress damage by detecting a back-end binding abnormality and stopping feeding the medium. Also, with this aspect, it is possible to determine presence or absence of a back-end binding abnormality based on an absolute value of the height, and to employ an inexpensive unit as the height detection unit. Thus, it is possible to suppress a cost increase of the apparatus.

According to a fourth aspect, in any one of the first to the third aspects, the first threshold value may differ depending on a size of the medium in the feeding direction, and the first threshold value to be applied when a back end of the medium in the feeding direction has a size that fits in the medium mounting section may be lower than the first threshold value to be applied when the back end of the medium in the feeding direction has a size that is out of the medium mounting section. When the back end of the medium in the feeding direction has a size that is out of the medium mounting section, the medium tends to rise from the movement detection unit with deformation of the medium on the medium mounting section. In other words, when the back end of the medium in the feeding direction has a size that fits the medium mounting section, the medium is said to be more difficult to rese from the movement detection unit than a case in which the back end of the medium in the feeding direction is out of the medium mounting section. Thus, with this aspect, the first threshold value to be applied when the back end of the medium in the feeding direction has a size that fits the medium mounting section is made lower than the first threshold value to be applied when the back end of the medium in the feeding direction is out of the medium mounting section. Thereby, it is possible to suppress skipping detection of a feeding abnormality too much using the movement detection unit, and thus to more suitably detect the feeding abnormality.

According to a fifth aspect, in any one of the first to the third aspects, the first threshold value may differ depending on a size of the medium in the feeding direction, and when a back end of the medium in the feeding direction is out of the medium mounting section, the first threshold value to be applied when the size of the medium in the feeding direction is a first size may be lower than the first threshold value to be applied when the size of the medium in the feeding direction is a second size larger than the first size.

When the back end of the medium in the feeding direction has a size that is out of the medium mounting section, the medium tends to rise from the movement detection unit with deformation of the medium on the medium mounting section. In this case, the medium is said to be more difficult to rise from the movement detection unit as the amount of protrusion of the medium back end from the medium mounting section is smaller. Thus, in this aspect, when the back end of the medium in the feeding direction is out of the medium mounting section, the first threshold value to be applied when the size of medium in the feeding direction is a first size is made lower than the first threshold value to be applied when the size of medium in the feeding direction is a second size larger than the first size. Thereby, it is possible to suppress skipping detection of a feeding abnormality using the movement detection unit too much, and thus to more suitably detect the feeding abnormality.

According to a sixth aspect, in any one of the first to the third aspects, the first threshold value may differ depending on a size of the medium in a width direction being a direction intersecting the feeding direction, and the first threshold value to be applied when a size of the medium in the width direction is a first size may be lower than the first threshold value to be applied when the size of the medium in the width direction is a second size smaller than the first size. The medium weighs heavier as the size of the medium in the width direction is larger, and thus the medium becomes more different to rise from the movement detection unit. With this aspect, in view of such a property, the first threshold value to be applied when the size of the medium in the width direction is a first size is set lower than the first threshold value to be applied when the size of the medium in the width direction is a second size smaller than the first size. Accordingly, it is possible to suppress skipping detection of a feeding abnormality using the movement detection unit too much, and thus to more suitably detect the feeding abnormality.

According to a seventh aspect, in any one of the first to the sixth aspects, the movement detection unit may include a two-dimensional sensor that outputs information related to movement of the medium in a first direction being a direction along the feeding direction and in a second direction being a direction intersecting the feeding direction. With this aspect, it is possible to detect the feeding abnormality more suitably by detecting the movement of the medium in the first direction and in the second direction.

According to an eighth aspect, in any one of the first to the seventh aspects, the height detection unit may include a distance measurement sensor that measures a distance to a medium positioned uppermost among the mediums mounted on the medium mounting section. With this aspect, the height detection unit includes a distance measurement sensor that measures the distance to the medium positioned uppermost among the mediums mounted on the medium mounting section, and thus it is possible to correctly detect the height.

According to a ninth aspect, there is provided a reading unit that reads a medium, and the medium feeding apparatus according to any one of the first to the eighth aspects, the medium feeding apparatus feeding the medium to the reading unit. With this aspect, the image reading apparatus has the advantages of the first aspect.

According to a tenth aspect, there is provided a medium feeding method in a medium feeding apparatus including a medium mounting section forming a mounting face for mounting a medium thereon, a feeding roller configured to feed a lowermost medium among mediums mounted on the medium mounting section in a feeding direction, and a movement detection unit disposed, at a position opposing the lowermost medium among the mediums mounted on the medium mounting section, upstream of the feeding roller in the feeding direction and configured to output information related to movement of the medium in a direction along the mounting face, the medium feeding method including: in abnormality detection processing for determining a feeding abnormality when movement of the medium after starting feeding the medium exceeds a permissible range based on information obtained from the movement detection unit, based on detection information detected by the medium height detection unit that outputs information related a height of the medium mounted on the medium mounting section from the mounting face, when the height is less than a first threshold value, continuing feeding the medium regardless of detection information detected by the movement detection unit or without obtaining detection information detected by the movement detection unit.

With this aspect, in the same manner as the first aspect, when the height is less than a first threshold value, feeding the medium is continued regardless of detection information detected by the movement detection unit or without obtaining detection information detected by the movement detection unit. Accordingly, it is possible to prevent stopping feeding a medium by mistakenly determining that a feeding abnormality has occurred although no feeding abnormality has occurred.

In the following, a specific description will be given of the present disclosure. Hereinafter a description will be given of a sheet-feed type scanner 1 (hereinafter simply referred to as a scanner) configured to read at least one of the front face and the back face of a document, which is an example of a medium, as an example of the image reading apparatus. Hereinafter a document is referred to as a document P.

In this regard, the X-Y-Z coordinate system illustrated in each diagram is an orthogonal coordinate system. The X-axis direction is the apparatus width direction, and is the document width direction, which is a direction intersecting the document feed direction. Also, the Y-axis direction is the document feed direction. In the present embodiment, the Y-axis direction has an inclination angle with respect to the horizontal. The Z-axis direction is a direction perpendicular to the Y-axis direction and substantially indicates a direction perpendicular to the face of the document to be fed and transported. Downstream in the feeding direction and the transport direction of the document P is denoted by +Y-direction, and upstream is denoted by −Y-direction.

FIG. 1 is an outer perspective view of the scanner 1. The scanner 1 includes an apparatus body 2 that includes a reader 20 (refer to FIG. 2) for reading an image of the document P. The apparatus body 2 includes a lower unit 3 and an upper unit 4. The upper unit 4 is disposed to be openable and closable by being rotatable with a rotational shaft not illustrated in the figure and disposed in the +Y-direction with respect to the lower unit 3 as center. It is possible to expose the inside of the apparatus by opening the upper unit 4 in the apparatus front face direction so as to handle the jam of the document P.

A document mounting section 11 having a mounting face 11a on which the document P to be fed is mounted is disposed on the back face of the apparatus body 2. Also, the document mounting section 11 is provided with a pair of edge guides that guide the side edges of the document P in the width direction of the document P. Specifically, edge guides 12A and 12B are disposed. The edge guides 12A and 12B are disposed in a displaceable manner so as to be positioned bilaterally symmetrical in the X-axis direction to each other with a center position CL (refer to FIG. 3) in the width direction of the mounting face 11a as center.

The apparatus body 2 includes, on the apparatus front face of the upper unit 4, an operation panel 7 that enables a user to set various reading settings and to perform reading. The upper portion of the upper unit 4 is provided with a feed opening 6 that is coupled to the inside of the apparatus body 2. The document P mounted on the document mounting section 11 is sent to the reading section 20 by a document feeding apparatus 10 described later. The document P that has been read is discharged from a discharge opening 18 disposed on the front face of the lower unit 3 to a paper output tray 5.

Figure 2:
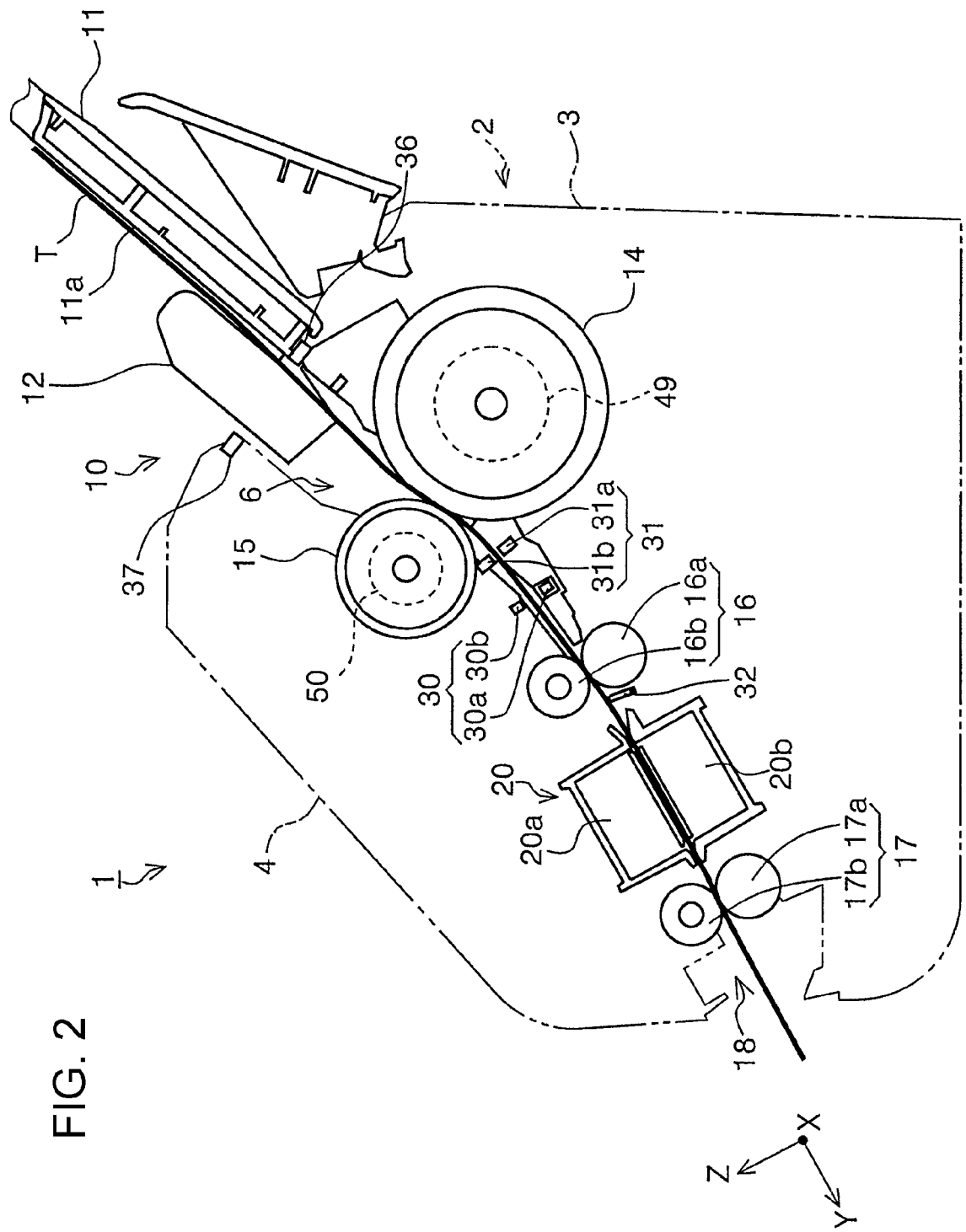
FIG. 2 is a sectional side view of a document transport path of the scanner.

Next, a description will be given of a document feed path of the scanner 1 with reference to FIG. 2 and FIG. 3. The scanner 1 includes the document feeding apparatus 10. The document feeding apparatus 10 includes the document mounting section 11 on which the document P is mounted, a feeding roller 14 that feeds the document P mounted on the document mounting section 11, a separation roller 15 that separates the document P, a controller 40 (refer to FIG. 4), which is an example of the control unit, and a two-dimensional sensor 36, which is an example of the movement detection unit. In this regard, it is possible to understand that the document feeding apparatus 10 is an apparatus produced by omitting a function of reading a document, specifically, a reading section 20 described later from the scanner 1. However, although the reading section 20 is disposed, it is possible to understand that the scanner 1 itself is a document feeding apparatus by focusing on the standpoint of document feeding. In FIG. 2, a solid line denoted by a sign T indicates the document feed path, in other words, a passage route of the document P to be fed and transported.

The uppermost stream of the document feed path T is provided with the document mounting section 11. The downstream of the document mounting section 11 is provided with a feeding roller 14 that transports the document P mounted on the mounting face 11a of the document mounting section 11 to the reader 20, and a separation roller 15 that nips and separates the document P from the feeding roller 14. The feeding roller 14 comes in contact with the lowermost portion of the document P mounted on the mounting face 11a of the document mounting section 11. Accordingly, when a plurality of sheets of the document P is set in the document mounting section 11 in the scanner 1, a sheet of the document P on the side of the mounting face 11a is fed downstream in order.

Figure 3:
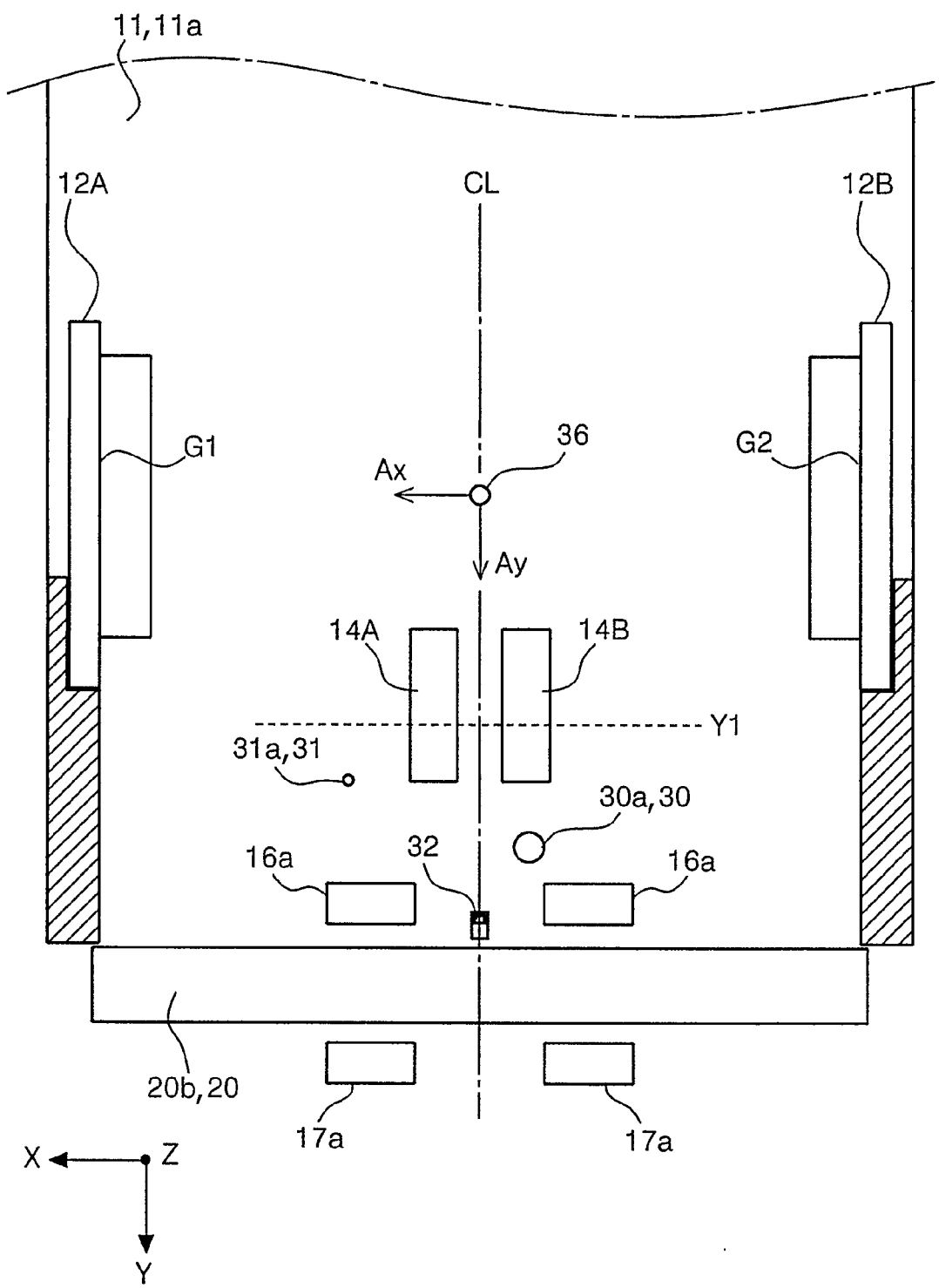
FIG. 3 is a plan view of the document transport path of the scanner.

As illustrated in FIG. 3, in the present embodiment, the feeding roller 14 includes two rollers such that the rollers are bilaterally symmetrical with respect to a center position CL in the X-axis direction. In FIG. 3, the feeding roller 14 on the left side of the center position CL is denoted by a sign 14A, and the feeding roller 14 on the right side of the center position CL is denoted by a sign 14B. In the same manner, the separation roller 15 also includes two rollers such that the rollers are bilaterally symmetrical with respect to the center position CL. In FIG. 3, a broken line Y1 denotes a document nipping position performed by the feeding roller 14 and the separation roller 15.

Figure 4:
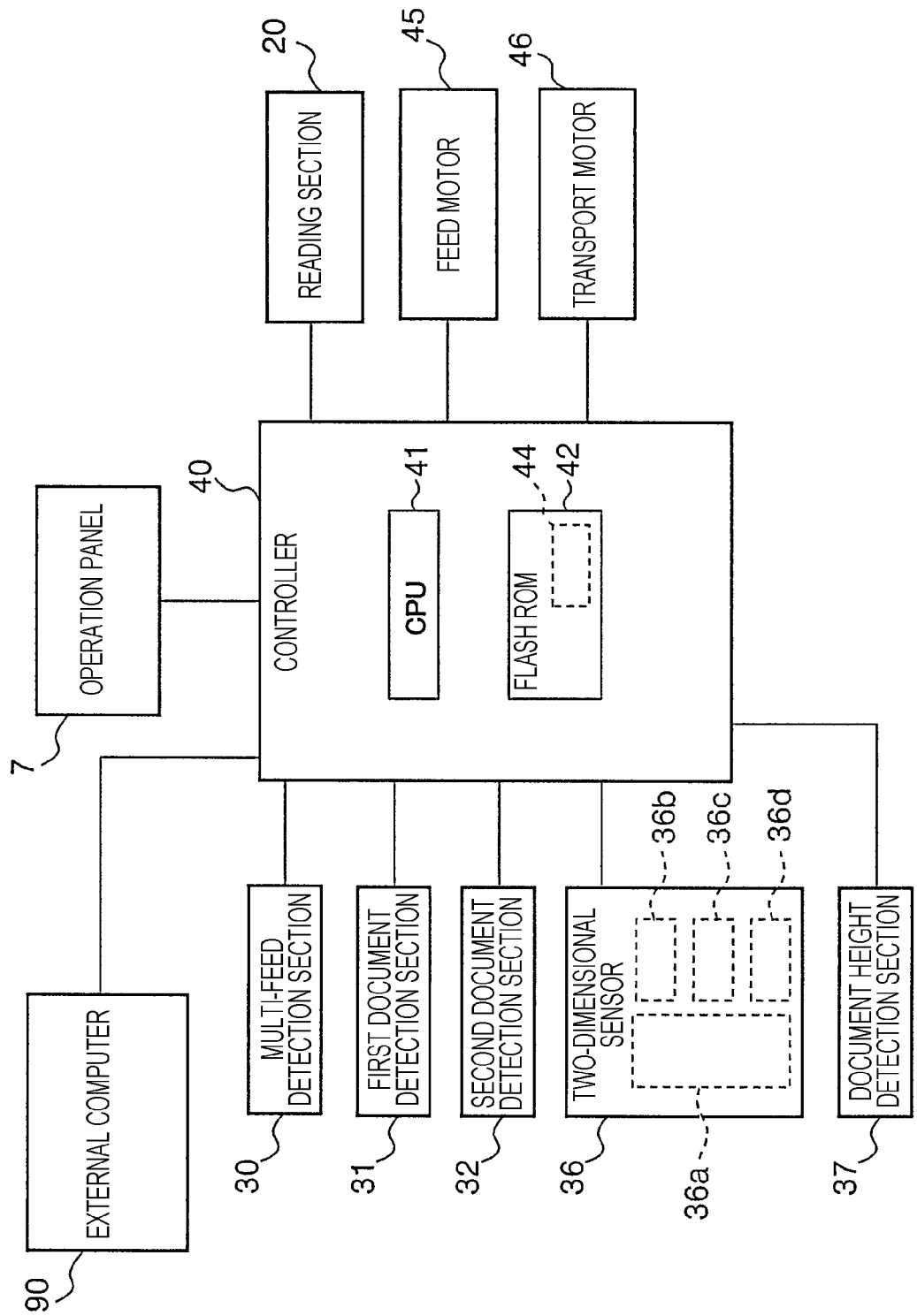
FIG. 4 is a block diagram illustrating a control system of the scanner.

The feeding roller 14 is rotationally driven by a feed motor 45 (refer to FIG. 4). The feeding roller 14 is rotated counterclockwise in FIG. 2 by being applied a rotational torque by the feed motor 45. A driving force transmission path between the feeding roller 14 and the feed motor 45 (refer to FIG. 4) is provided with a one-way clutch 49, and thus when the feed motor 45 is reversely rotated, the feeding roller 14 is not reversely rotated. Also, in the state in which the feed motor 45 is stopped, it is possible for the feeding roller 14 to keep in contact with the document P being transported, and to be rotated counterclockwise in FIG. 2. For example, when the front end of the document P is detected by a second document detection section 32 disposed downstream of a pair of transport rollers 16, the controller 40 stops driving of the feed motor 45 and drives only a transport motor 46. Thereby, the document P is transported by the pair of transport rollers 16, and the feeding roller 14 is driven counterclockwise in FIG. 2 by keeping in contact with the document P being transported.

Next, the transport motor 46 (refer to FIG. 4) transmits a rotational torque to the separation roller 15 via a torque limiter 50. During the feed operation of the document P, the transport motor 46 (refer to FIG. 4) transmits a drive torque to the separation roller 15 so as to rotate the separation roller 15 counterclockwise in FIG. 2.

When the document P does not exist between the feeding roller 14 and the separation roller 15, or when only one sheet lies therebetween, the rotational torque that causes the separation roller 15 to rotate clockwise in FIG. 2 exceeds a limit torque of the torque limiter 50. Thereby, a slip occurs in the torque limiter 50 so that the separation roller 15 is rotationally driven clockwise in spite of the rotational torque applied from the transport motor 46 (refer to FIG. 4).

In contrast, when the second and later sheets of the document P are further caught between the feeding roller 14 and the separation roller 15 in addition to a sheet of the document P to be fed, a slip occurs among the sheets of the document. Thereby, the separation roller 15 is rotated counterclockwise in FIG. 2 by the drive torque applied from the transport motor 46 (refer to FIG. 4). Thereby, the second and later sheets of the document P being multiply fed are returned upstream, that is to say, multiple feed of the document P is prevented.

The downstream of the feeding roller 14 is provided with the pair of transport rollers 16, the reader 20 that reads an image, and a pair of discharge rollers 17. The pair of transport rollers 16 includes a transport drive roller 16a that is rotationally driven by a transport roller motor 46 (refer to FIG. 4), and a transport driven roller 16b that is rotationally driven. In the present embodiment, as illustrated in FIG. 3, the transport drive roller 16a includes two rollers such that the rollers are bilaterally symmetrical with respect to the center position CL. Although the transport driven roller 16b is omitted in FIG. 3, the transport driven roller 16b also includes two rollers such that the rollers are bilaterally symmetrical with respect to the center position CL in the same manner. The document P that has been nipped by the feeding roller 14 and the separation roller 15, and has been fed downstream is nipped by the pair of transport rollers 16, and is transported to the reader 20 located downstream of the pair of transport rollers 16.

The reader 20 includes an upper reading sensor 20a disposed on the upper unit 4 and a lower reading sensor 20b disposed on the lower unit 3. In the present embodiment, the upper reading sensor 20a and the lower reading sensor 20b includes a contact-type image sensor module (CISM), for example.

The image of at least one of the front face and the back face of the document P is read by the reader 20, is nipped by the pair of discharge rollers 17 located downstream of the reader 20, and is discharged from a discharge opening 18 disposed on the apparatus front face of the lower unit 3. The pair of discharge rollers 17 includes a discharge drive roller 17a rotationally driven by the transport roller motor 46 (refer to FIG. 4) and a discharge driven roller 17b that is rotationally driven. In the present embodiment, as illustrated in FIG. 3, the discharge drive roller 17a includes two rollers such that the rollers are bilaterally symmetrical with respect to the center position CL. Although illustration is omitted in FIG. 3, the discharge driven roller 17b also includes two rollers such that the rollers are bilaterally symmetrical with respect to the center position CL in the same manner.

In the following, a description will be given of a control system in the scanner 1 with reference to FIG. 4. FIG. 4 is a block diagram illustrating the control system of the scanner 1 according to the present disclosure. In FIG. 4, as the control unit, the controller 40 performs various kinds of control of the scanner 1 including feeding, transporting, discharging, and reading of the document P. The controller 40 receives a signal input from the operation panel 7.

The controller 40 controls the feed motor 45 and the transport motor 46. Both the feed motor 45 and the transport motor 46 are DC motors in the present embodiment. The controller 40 receives input of read data from the reader 20, and the controller 40 also transmits a signal for controlling the reader 20 to the reader 20. The controller 40 also receives signals from the detection units, such as a mounting detection section 35 described later, a two-dimensional sensors 36, a multi-feed detection section 30, a first document detection section 31, and a second document detection section 32. The controller 40 also receives input of the detection values of an encoder that detects the rotation amount of the feed motor 45 and an encoder that detects the rotation amounts of the transport drive roller 16a and the discharge drive roller 17a. Thereby, it is possible for the controller 40 to detect the amount of document transport by each of the rollers.

The controller 40 includes a CPU 41 and a flash ROM 42. The flash ROM 42 is a nonvolatile memory configured to be read and written. The CPU 41 performs various operation processing in accordance with a program 44 stored in the flash ROM 42 to control the operation of the entire scanner 1. Here, the program 44 stored in the flash ROM 42 does not necessarily mean one program, and includes a plurality of programs. The programs include a program for determining abnormality processing described later, various control programs necessary for feeding, transporting and reading the document P, and the like.

Also, the scanner 1 is configured to be coupled to an external computer 90, and the controller 40 receives input of information from the external computer 90. The external computer 90 includes a display section not illustrated in FIG. 4. On the display section, a user interface (UI) is realized by a control program stored in a storage unit, which is not illustrated in FIG. 4, included in the external computer 90.

Next, a description will be given of each detection unit disposed on the document feed path T. The document mounting section 11 is provided with a two-dimensional sensor 36 as a movement detection unit that outputs information related to the movement of the document P on X-Y plane, that is to say, the movement of the document P in the direction along the mounting face 11a of the document mounting section 11. The two-dimensional sensor 36 is disposed so as to face the lowermost sheet of the document P mounted on the document mounting section 11.

The two-dimensional sensor 36 is a sensor that is based on the same or a similar principle as a sensor configured to detect the movement of a detection object on a two-dimensional coordinate system, which is used by a computer mouse. The two-dimensional sensor 36 includes a controller 36a, a light source 36b, a lens 36c, and an image sensor 36d. The light source 36b is a light source for irradiating the document P mounted on the document mounting section 11 with light via the lens 36c, and it is possible to employ a light source, for example, a red LED, an infrared LED, laser, a blue LED, and the like. In the present embodiment, laser light is used. It is possible to switch between the light-emitting state and the non-light emitting state of the light source 36b under the control the controller 40. The lens 36c guides the light emitted from the light source 36b to the document P mounted on the document mounting section 11 so that the document is irradiated.

The image sensor 36d is a sensor that receives reflected light from the document P mounted on the document mounting section 11, and may be an image sensor, such as a CMOS, a CCD, or the like. The image sensor 36d includes an array of pixels arranged in a first axis Ay direction and a second axis Ax direction perpendicular to the first axis Ay direction. The first axis Ay direction and the second axis Ax direction are illustrated in FIG. 3. In the present embodiment, the first axis Ay direction is a direction parallel to the Y-axis direction, and the second axis Ax is a direction parallel to the X-axis direction. The first axis Ay direction is an example of the first direction, and the second axis Ax is an example of the second direction. In this regard, in the present embodiment, the "first axis Ax direction" does not mean either one of +Ax direction or −Ax direction, but means the both directions. In the same manner, "second axis Ay direction" does not mean either one of +Ay direction or −Ay direction, but means both of the directions.

The controller 36a analyzes an image obtained by the image sensor 36d and outputs a movement amount Wy of the image in the first axis Ay direction and a movement amount Wx in the second axis Ax direction as detection values. It is possible to use a publicly known method for the image analysis method performed by the controller 36a.

The controller 40, which obtains the movement amounts Wy and Wx from the two-dimensional sensor 36, uses the obtained movement amounts Wy and Wx to determine the movement of the document P being fed. The two-dimensional sensor 36 according to the present embodiment outputs the movement amounts Wx and Wy to the controller 40. The output values are reset to zero by an initialization instruction output by the controller 40. It is possible for the controller 40 to grasp whether or not the document P moves in the first axis Ay direction at the position of the two-dimensional sensor 36 by obtaining the movement amount Wy. Also, it is possible for the controller 40 to grasp whether or not the document P moves in the second axis Ax direction at the position of the two-dimensional sensor 36 by obtaining the movement amount Wx.

In this regard, the description has been given of the two-dimensional sensor 36 that is configured to use an optical method, for example. However, the sensor may be configured to use a mechanical method, and more specifically, the sensor may be configured to include track balls, a rotary encoder for detecting the rotation of the track ball in the first axis Ay direction, and a rotary encoder for detecting the rotation of the track ball in the second axis Ax direction. However, it is possible to more correctly detect the movement of the document P by employing the two-dimensional sensor 36. Also, in the present embodiment, one two-dimensional sensor 36 obtains both the movement amount Wy, which is a detection value in the first axis Ay direction, and the movement amount Wx, which is a detection value in the second axis Ax direction. However, a sensor for detecting a detection value in the first axis Ay direction and a sensor for detecting a detection value in the second axis Ax direction may be separately disposed.

Next, a document height detection section 37, which is an example of the medium height detection unit, is disposed at the position opposing the documents P mounted on the document mounting section 11. It is possible for the document height detection section 37 to include a distance measurement sensor, for an example. It is possible to use a publicly known distance measurement sensor, such as an optical type, an ultrasonic type, and the like. In the present embodiment, for an example, an ultrasonic type is used. An ultrasonic distance measurement sensor includes a transmission section that emits ultrasonic wave (not illustrated in the figure) and a reception section that receives the ultrasonic wave (not illustrated in the figure). It is possible for the controller 40 that receives a detection signal from the document height detection section 37 to calculate a distance to the uppermost document P among the documents P mounted on the document mounting section 11 based on the time required from the emission of ultrasonic wave to reception of the ultrasonic wave, and thereby to obtain the height of the document P from the mounting face 11a. Hereinafter a height of the document P from the mounting face 11a is referred to as a document height Zt. In this regard, it is possible to use not only a non-contact sensor, but a contact sensor for the document height detection section 37.

In this manner, the medium height detection unit includes a distance measurement sensor that measures the distance to the document P positioned uppermost among the mediums mounted on the document mounting section 11, and thus it is possible to correctly detect the document height Zt.

The first document detection section 31 is disposed in the downstream neighborhood of the feeding roller 14. The first document detection section 31 includes an optical sensor as an example, and includes a light emitter 31a and a light receiver 31b that are disposed facing each other by sandwiching the document feed path T as illustrated in FIG. 2. The light receiver 31b transmits an electronic signal indicating the intensity of detection light to the controller 40. The transported document P blocks the detection light emitted from the light emitter 31a so that an electronic signal indicating the intensity of the detection light changes. Thereby it is possible for the controller 40 to detect the passing of the front end or the back end of the document P.

A multi-feed detection section 30 that detects multiple feed of the document P is disposed downstream of the first document detection section 31. As illustrated in FIG. 2, the multi-feed detection section 30 includes an ultrasonic transmitter 30a and an ultrasonic receiver 30b for receiving ultrasonic wave, which are disposed facing each other by sandwiching the document feed path T. The ultrasonic receiver 30b transmits an output value in accordance with the intensity of the detected ultrasonic wave to the controller 40. When multiple feed of the document P occurs, the electronic signal indicating the intensity of the ultrasonic wave changes, and thereby, it is possible for the controller 40 to detect multiple feed of the document P.

A second document detection section 32 is disposed downstream of the pair of transport rollers 16, that is to say, further downstream of the multi-feed detection section 30. The second document detection section 32 is configured as a contact type sensor having a lever. When the lever is rotated by passing of the front end or the back end of the document P, the electronic signal transmitted from the second document detection section 32 to the controller 40 changes. Thereby, it is possible for the controller 40 to detect the passing of the front end or the back end of the document P. It is possible for the controller 40 to obtain the position of the document P in the document feed path T by the first document detection section 31 and the second document detection section 32 described above.

Next, a description will be given of abnormality detection processing using the two-dimensional sensor 36. When the movement of the document P after starting feeding the document P exceeds a permissible range, the controller 40 performs abnormality detection processing for determining that a feeding abnormality has occurred based on the movement amounts Wx and Wy, which are detection values obtained from the two-dimensional sensor 36. When the controller 40 determines that a feeding abnormality has occurred, the controller 40 stops feeding and transporting the document P. In the present embodiment, specifically, the controller 40 stops the feed motor 45 and the transport motor 46.

Figure 5:
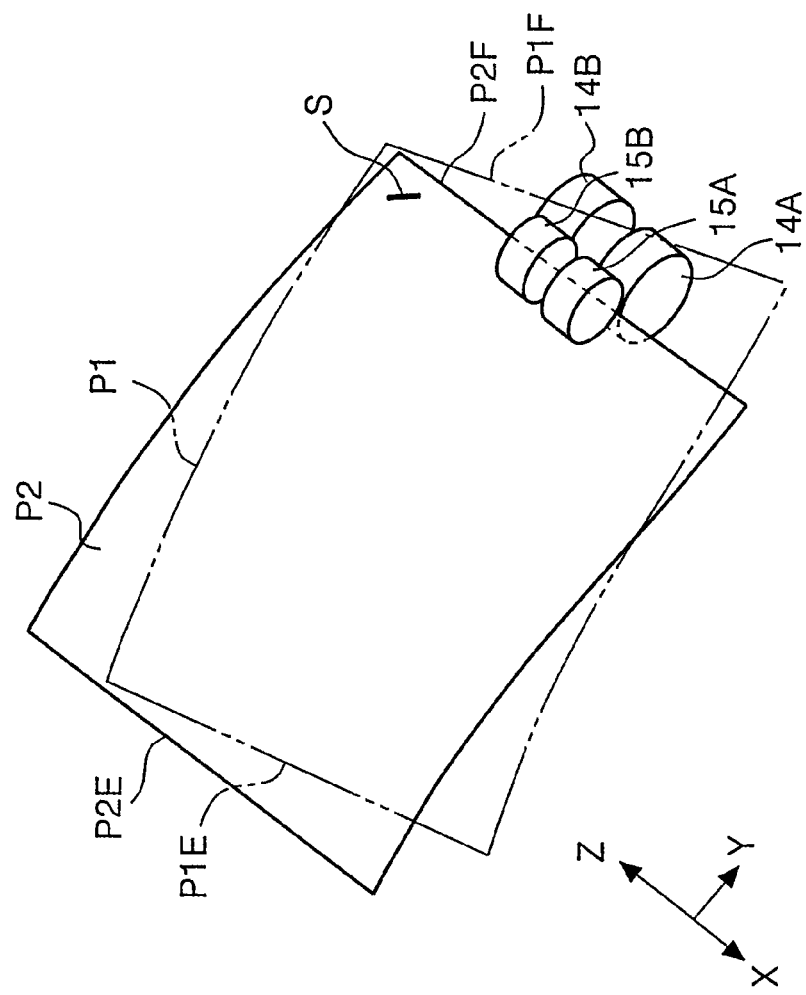
FIG. 5 is a schematic diagram illustrating a phenomenon that occurs when a document bound with a binding needle downstream in the feeding direction is fed.

Examples of feeding abnormalities include an abnormality that occurs when a plural sheets of the document P are mounted on the document mounting section 11 in a state of being bound and are fed without change. The feeding abnormalities include a back-end binding abnormality in which the plural sheets of the document P are bounded at the back end and a front-end binding abnormality in which the plural sheets of the document P are bounded at the front end. FIG. 5 illustrates a front-end binding abnormality. A sign P1 denotes the lowermost document to be fed in contact with the feeding roller 14, and a sign P2 denotes a document mounted on the lowermost document. Hereinafter the lowermost document denoted by the sign P1 is referred to as a preceding document P1, and the document mounted on the lowermost document is referred to as a subsequent document P2. The preceding document P1 is denoted by a dash-double-dot line, and the subsequent document P2 is denoted by a solid line. Also, a sign P1F denotes the downstream end of the preceding document P1 in the feeding direction, that is to say, the front end, and a sign P1E denotes the upstream end in the feeding direction, that is to say, the back end. Also, a sign P2F denotes the downstream end of the subsequent document P2 in the feeding direction, that is to say, the front end, and a sign P2E denotes the upstream end in the feeding direction, that is to say, the back end.

The preceding document P1 and the subsequent document P2 are bound downstream in the feeding direction, that is to say, at the front end at the −X-direction corner. When the preceding document P1 is fed by the feeding roller 14 downstream in the feeding direction from this state, the front end P2F of the subsequent document P2 keeps the stop state at the separation roller 15. Accordingly, only the preceding document P1 proceeds downstream. At this time, since the preceding document P1 is bound by a binding needle S, the preceding document P1 is rotated around the binding needle S. Accordingly, the front end in the +X-direction proceeds more remarkably downstream.

This phenomenon appears as in the detection value in the second axis Ax direction of the two-dimensional sensor 36.

Accordingly, when the movement amount Wx, which is a detection value in the second axis Ax direction, exceeds a predetermined threshold value, that is to say, when the movement of the document P exceeds a permissible range, the controller 40 determines that a front-end binding abnormality has occurred and stops feeding the document.

Figure 6:
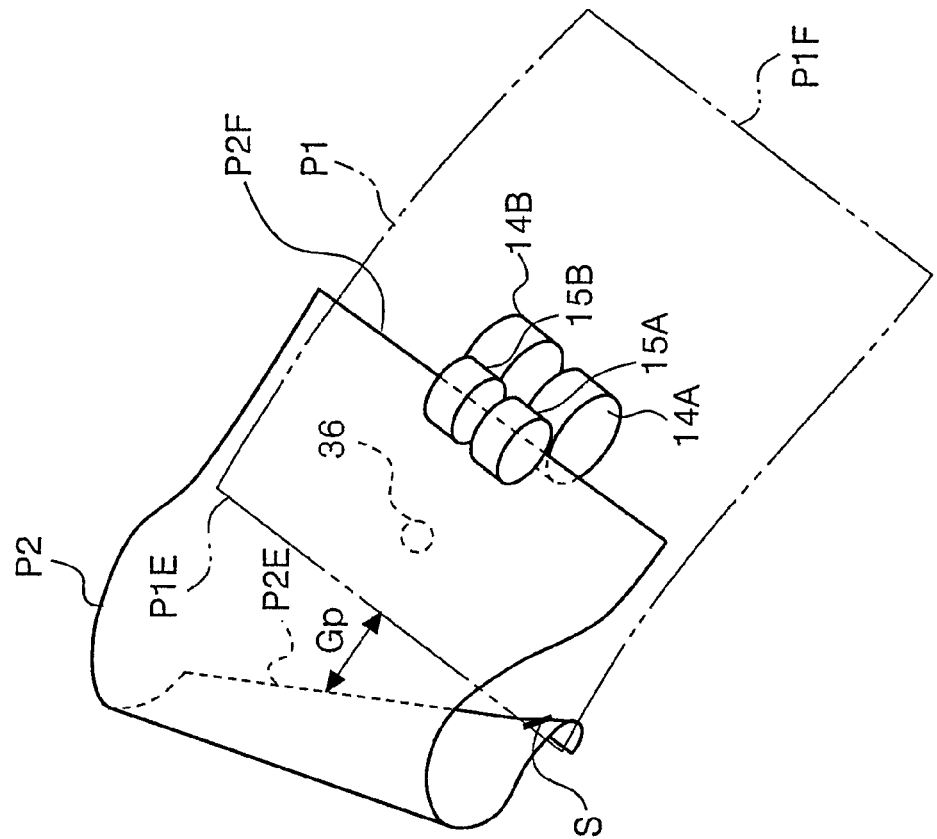
FIG. 6 is a schematic diagram illustrating a phenomenon that occurs when a document bound with a binding needle upstream in the feeding direction is fed.

Next, FIG. 6 illustrates a back-end binding abnormality. The preceding document P1 and the subsequent document P2 are bound upstream in the feed direction, that is to say, at the corner of the back end in the +X-direction by a binding needle S. When the preceding document P1 is fed by the feeding roller 14 downstream in the feeding direction from this state, only the back end P2E of the subsequent document P2 proceeds downstream in the state in which the front end P2F stops by the separation roller 15, and the subsequent document P2 rises upward. Further, the back end area of the subsequent document P2 is reversed, and an interval Gp in the Y-axis direction is formed between the back end P2E of the subsequent document P2 and the back end PIE of the preceding document P1. The interval Gp differs depending on the position in the X-axis direction. The interval Gp illustrated in FIG. 6 is an interval in the X-axis direction at the disposition position of the two-dimensional sensor 36.

Accordingly, although the controller 40 does not perform feeding operation of the subsequent document P2, when the controller 40 detects an interval Gp based on the detection value of the two-dimensional sensor 36 in the first axis Ay direction, that is to say, the movement amount Wy, that is to say, when the controller 40 detects the back end P2E of the subsequent document P2, the controller 40 determines that the movement of the document P exceeds a permissible range so that a back-end binding abnormality has occurred, and stops feeding of the document.

As described above, the movement detection unit that outputs information related to the movement of the document P along the mounting face 11a of the document mounting section 11 includes the two-dimensional sensor 36 that outputs information related to the movement of the document P in the first axis Ay direction and in the second axis Ax direction. Accordingly, it is possible to suitably detect a feeding abnormality.

Here, the feeding abnormality described above is determined based on the detection value of the two-dimensional sensor 36. The two-dimensional sensor 36 outputs a correct detection value when the document P is close to the two-dimensional sensor 36, but when the document P rises from the two-dimensional sensor 36, the reliability of the detection value deteriorates. Accordingly, although a feeding abnormality has not occurred, the controller 40 mistakenly determines that a feeding abnormality has occurred and stops the feeding of the document P. Thereby, a user might be caused to perform useless operation. Thus, the controller 40 performs abnormality detection processing based on the amount of the document P mounted on the document mounting section 11, that is to say, the document height Zt.

Figure 7:
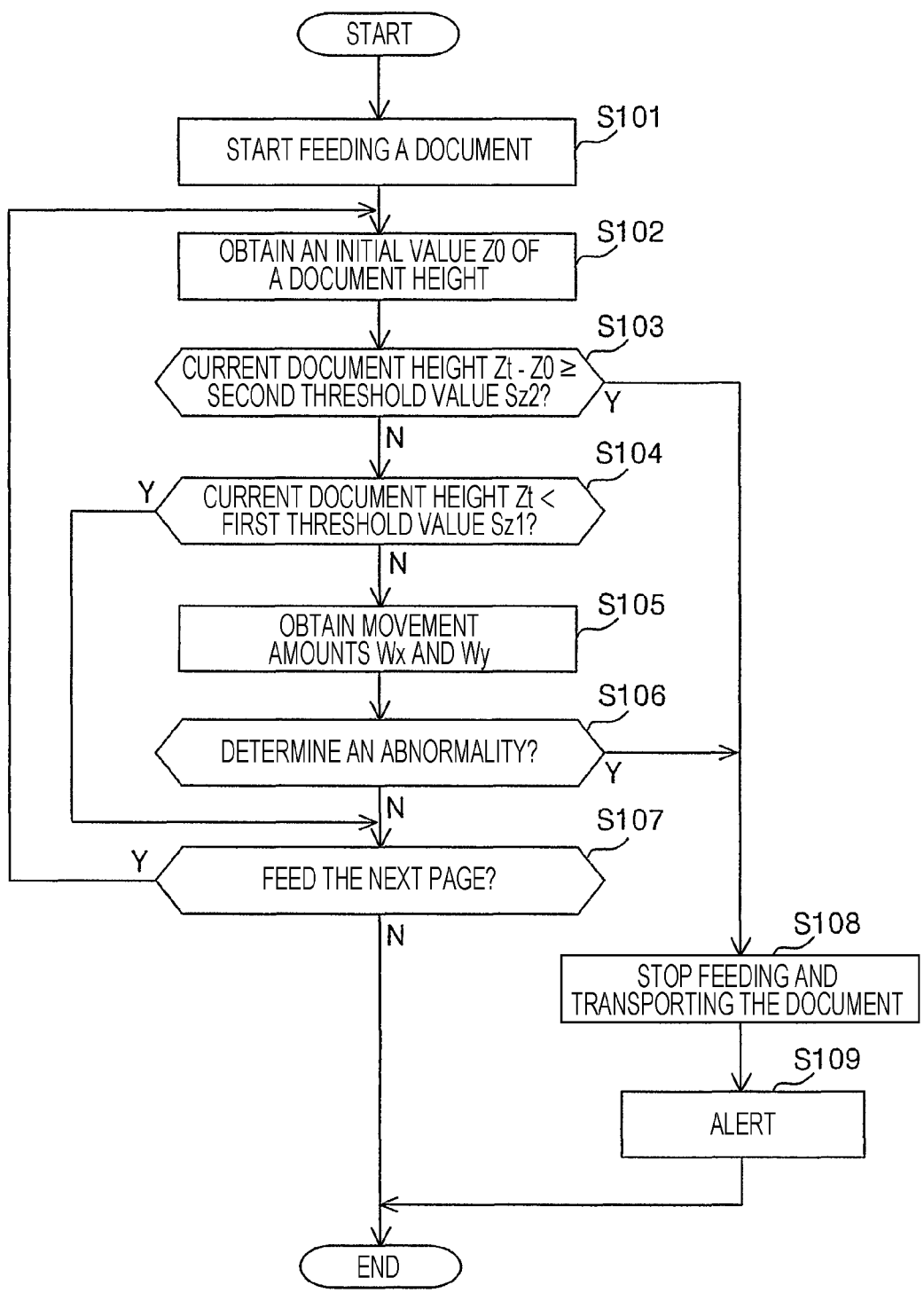
FIG. 7 is a flowchart illustrating a flow of abnormality detection processing.

Specifically, when the controller 40 receives a start instruction of feeding a document in FIG. 7, which illustrates the flow of the abnormality detection processing, the controller 40 starts rotation of the feed motor 45 (refer to FIG. 4) and the transport motor 46 (refer to FIG. 4), and starts feeding of the document P (step S101). Next, the controller 40 obtains an initial value Z0 of a document height Zt based on detection information of the document height detection section 37 (step S102). In this regard, in the present embodiment, the controller 40 obtains the initial value Z0 of the document height Zt immediately after starting the feeding of the document P. However, the controller 40 may obtain the initial value Z0 of the document height Zt after starting rotation of the feed motor 45 and the transport motor 46 and applying a predetermined weight, or may obtain the initial value Z0 of the document height Zt before starting rotation of the feed motor 45 and the transport motor 46.

Next, the controller 40 determines whether or not the difference between the current document height Zt and the initial value Z0 is equal to or larger than a second threshold value Sz2 (step S103). The second threshold value Sz2 is a threshold value for detecting a rise of the document P based on a back-end binding abnormality described with reference to FIG. 6. When the difference between the current document height Zt and the initial value Z0 is equal to or larger than the second threshold value Sz2 (Yes in step S103), the controller 40 stops feeding and transporting the document P because of the occurrence of a back-end binding abnormality (step S108), and issues an alert notifying a user of the occurrence of a feeding abnormality (step S109).

When the difference between the current document height Zt and the initial value Z0 is less than the second threshold value Sz2 (No in step S103), the controller 40 determines whether or not the current document height Zt, in other words, the current amount of the documents mounted is less than the first threshold value Sz1 (step S104). When the current document height Zt is less than the first threshold value Sz1 as a result (Yes in step S104), a determination of a feeding abnormality using the two-dimensional sensor 36 (steps S105 and S106) is skipped, and the processing proceeds to step S107.

In contrast, when the current document height Zt exceeds the first threshold value Sz1 (No in step S104), a determination of a feeding abnormality is made using the two-dimensional sensor 36 (steps S105 and S106), and the processing proceeds to step S107. In the abnormality determination in step S106, a determination of a feeding abnormality including the above-described front-end binding abnormality and back-end binding abnormality is made. When a determination is made as a feeding abnormality as a result (Yes in step S106), the controller 40 stops feeding and transporting of the document P (step S108) and issues an alert notifying a user of the occurrence of a feeding abnormality (step S109).

In step S107, the controller 40 determines whether or not to feed the next page. When there is the next page (Yes in step S107), the processing returns to step S103. Whereas when there is no next page (No in step S107), the processing ends. In this regard, it is possible to determine presence or absence of the next page based on the detection value of the two-dimensional sensor 36. However, a sensor for determining presence or absence of the document P on the document mounting section 11 may be separately disposed.

Figure 8:
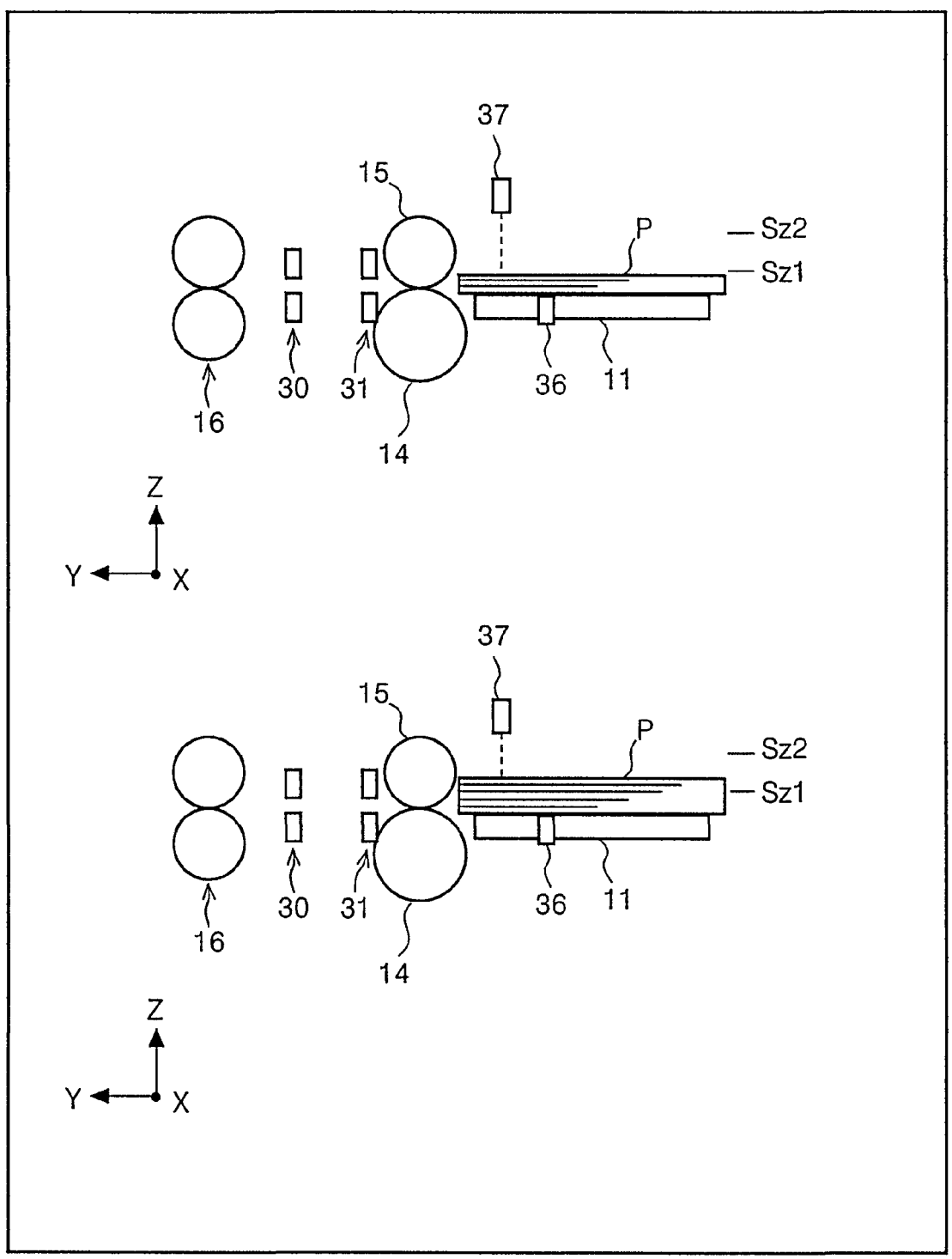
FIG. 8 is a diagram schematically illustrating the document transport path.

The upper diagram in FIG. 8 is an example of a case in which the current document height Zt is less than the first threshold value Sz1. The lower diagram in FIG. 8 is an example of a case in which the current document height Zt exceeds the first threshold value Sz1. As illustrated in the upper diagram in FIG. 8, when the amount of documents mounted is small, the load received by the lowermost document P being fed from the documents P mounted thereon is small, and thus the document P is liable to rise from the document mounting section 11. In such a case, a determination of a feeding abnormality using the two-dimensional sensor 36 is not performed. In contrast, when the amount of documents mounted is large as illustrated in the lower diagram in FIG. 8, the load received by the lowermost document P being fed from the documents P mounted thereon is large, the document P is different to rise from the document mounting section 11, and it is assumed that a determination of a feeding abnormality using the two-dimensional sensor 36 is made in such a case.

As described above, when the document height Zt is less than the first threshold value Sz1 based on the detection information detected by the document height detection section 37 in the abnormality detection processing (Yes in step S104 of FIG. 7), the controller 40 continues feeding the medium regardless of the detection information of the two-dimensional sensor 36 or without obtaining detection information by the two-dimensional sensor 36. Accordingly, it is possible to prevent mistakenly determining that a feeding abnormality has occurred and stopping feeding of the document P although no feeding abnormality has occurred. In this regard, in step S104 of FIG. 7, when the document height Zt is less than the first threshold value Sz1 (Yes in step S104), the feeding abnormality determination using the two-dimensional sensor 36 (steps in S105 and S106) is skipped. However, instead of this, the processing of steps S105 and S106 may be performed, and, in step S106, the processing may proceed to step S107 regardless of an abnormality determination result.

Also, when the controller 40 starts feeding the document P, the controller 40 obtains an initial value Z0 of the document height Zt based on the detection information detected by the document height detection section 37. After that, when a variation of the document height Zt from the initial value Z0 exceeds the second threshold value Sz2 (Yes in step S103 of FIG. 7), the controller 40 stops feeding the document P, and thus it is possible to suppress damage that occurs on the document P by detecting a back-end binding abnormality and stopping feeding the document P. Also, in the present embodiment, presence or absence of a back-end binding abnormality is determined based on a variation of the document height Zt from the initial value Z0, and thus it is possible to suitably determine presence or absence of a back-end binding abnormality regardless of the amount of the documents P mounted.

Figure 9:
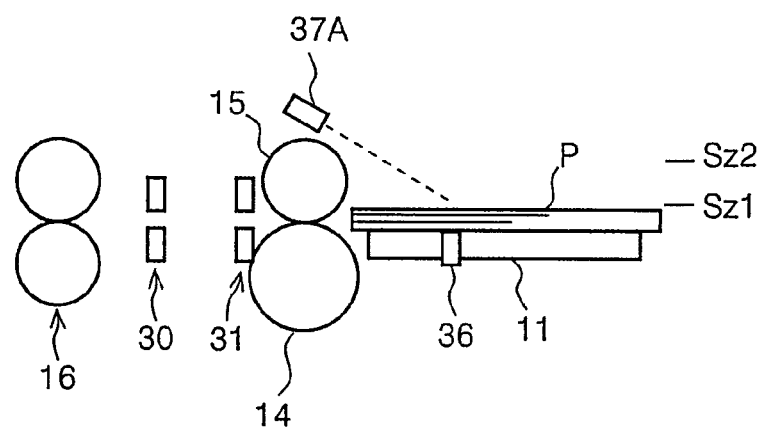
FIG. 9 is a diagram illustrating a document height detection section according to another embodiment.

In this regard, in the present embodiment, the document height detection section 37 is disposed at a position opposing the two-dimensional sensor 36. However, as illustrated in the document height detection section 37A in FIG. 9, the document height detection section 37 may be disposed at a position deviated from a position opposing the two-dimensional sensor 36.

Figure 11:
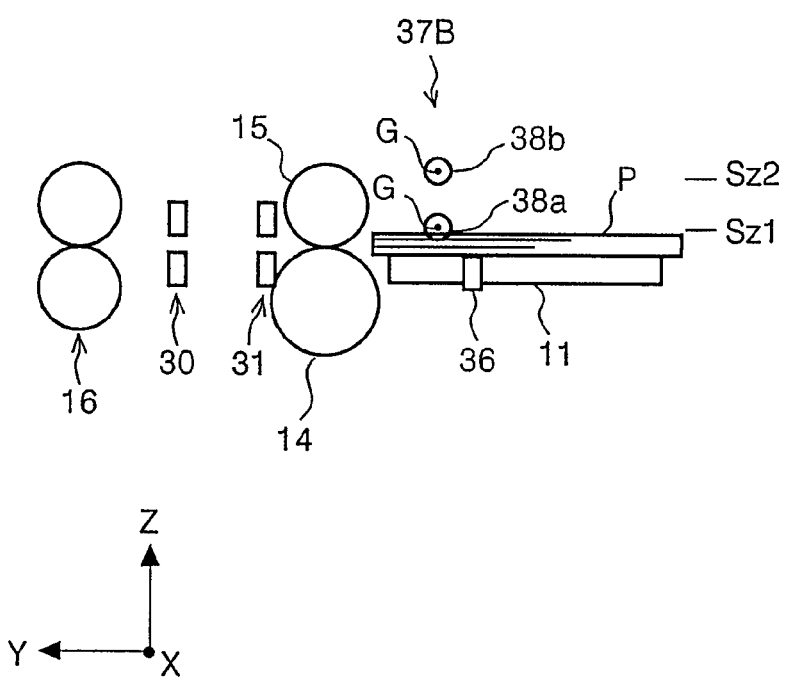
FIG. 11 is a diagram illustrating a document height detection section according to still another embodiment.

Also, as illustrated in FIG. 11, the document height detection section may include a plurality of sensor sections in the document mounting direction. A document height detection section 37B illustrated in FIG. 11 includes sensor sections 38a and 38b, which are optical sensors, disposed in the document mounting direction. A sign G denotes an optical axis of detection light. In FIG. 11, sensor sections 38a and 38b are disposed such that the optical axes G are parallel to the X-axis. In the present embodiment, the sensor section 38a is disposed at a height corresponding to the first threshold value Sz1, and the sensor section 38b is disposed at a height corresponding to the second threshold value Sz2. In this regard, the sensor sections 38a and 38b may employ a reflected light detected method in which a light emission section and a light reception section are disposed on the same side in the X-axis direction or a transmitted light detection method in which a light emission section and a light reception section are disposed by sandwiching the document mounting section 11 in the X-axis direction. Also, in the present embodiment, the optical axis G of the detection light is parallel to the X-axis direction. However, the optical axis G may be parallel to the Y-axis direction.

Figure 10:
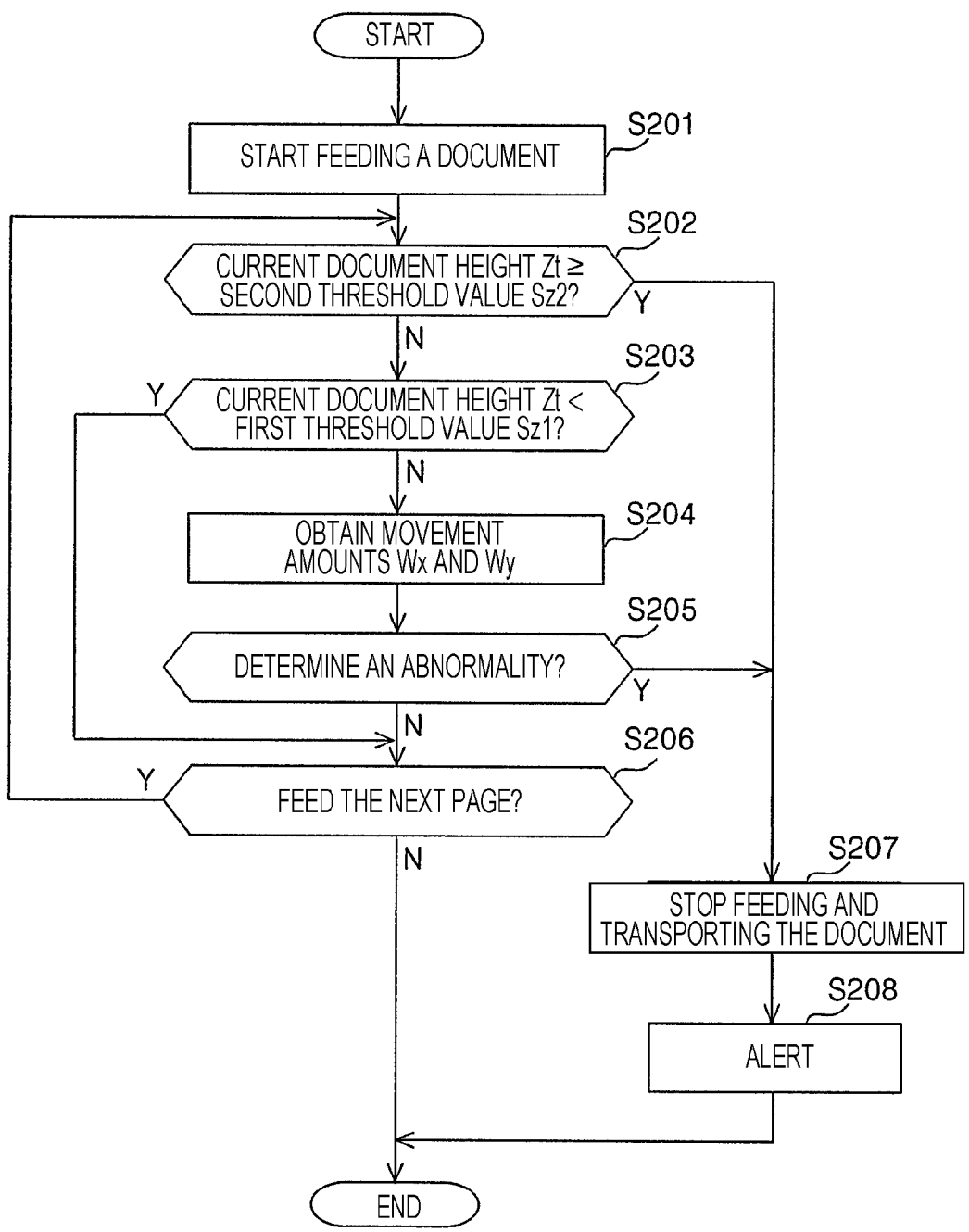
FIG. 10 is a flowchart illustrating a flow of abnormality detection processing according to another embodiment.

When the document height detection section 37B like this is applied, the controller 40 performs abnormality detection processing illustrated in FIG. 10. In FIG. 10, when the controller 40 receives a document feed start instruction, the controller 40 starts rotation of the feed motor 45 (refer to FIG. 4) and the transport motor 46 (refer to FIG. 4), and starts feeding the document P (step S201).

Next, the controller 40 determines whether or not the current document height Zt is equal to or higher than the second threshold value Sz2 (step S202). It is possible to grasp whether or not the current document height Zt is equal to or higher than the second threshold value Sz2 by the detection information of the sensor section 38b. When the document height Zt is equal to or higher than the second threshold value Sz2 (Yes in step S202), the controller 40 stops feeding and transporting the document P due to the occurrence of a back-end binding abnormality (step S207), and issues an alert notifying a user of the occurrence of a feeding abnormality (step S208).

When the current document height Zt is less than the second threshold value Sz2 (No in step S202), the controller 40 determines whether or not the current document height Zt, in other words, the current amount of documents mounted is less than the first threshold value Sz1 (step S203). It is possible to grasp whether or not the current amount of documents mounted is less than the first threshold value Sz1 by the detection information of the sensor section 38b. As a result, when the current document height Zt is less than the first threshold value Sz1 (Yes in step S203), the determination of a feeding abnormality using the two-dimensional sensor 36 (steps S204 and S205) is skipped, and the processing proceeds to step S206.

In contrast, when the current document height Zt exceeds the first threshold value Sz1 (No in step S203), the controller 40 performs determination of a feeding abnormality using the two-dimensional sensor 36 (steps S204 and S205), and the processing proceeds to step S206. In the abnormality determination in step S205, a determination of a feeding abnormality including the above-described front-end binding abnormality and back-end binding abnormality is performed. As a result, when determined that a feeding abnormality has occurred (Yes in step S205), the controller 40 stops feeding and transporting the document P (step S207), and issues an alert notifying a user that a feeding abnormality has occurred (step S208).

In step S206, the controller 40 determines whether or not to perform feeding of the next page. When the next page exists (Yes in step S206), the processing returns to step S202, whereas when the next page does not exist (No in step S206), the processing ends. In this regard, it is possible to determine presence or absence of the next page based on the detection value of the two-dimensional sensor 36. However, a sensor for detecting presence or absence of the document P on the document mounting section 11 may be separately disposed.

As described above, in the present embodiment, presence or absence of a back-end binding abnormality is determined based on the absolute value of the document height Zt (step S202), it is possible to employ an inexpensive sensor as the document height detection section, and thus to suppress a cost increase. In this regard, in the present embodiment, the document height detection section 37B includes the two sensor sections 38a and 38b. However, the configuration is not limited to this, and three or more sensor sections may be disposed. Also, from the viewpoint of performing determination processing based on the first threshold value Sz1 (step S203), only one sensor section may be disposed.

In this regard, the first threshold value Sz1 described above may differ depending on the size in the Y-axis direction of the document P, that is to say, the feeding direction. Specifically, the first threshold value Sz1 to be applied when the document P has a size such that the back end fits in the document mounting section 11 is made smaller than the first threshold value Sz1 to be applied when the document P has a size such the back end protrudes from the document mounting section 11. That is to say, when the document P has a size such that the back end protrudes from the document mounting section 11, the document P becomes liable to rise from the two-dimensional sensor 36 with deformation of the document P on the document mounting section 11. In other words, when the document P has a size such that the back end of the document P fits in the document mounting section 11, the back end of the document P is said to be more difficult to rise from the two-dimensional sensor 36 than a case in which the back end of the document P protrudes from the document mounting section 11. Thus, the first threshold value Sz1 to be applied when the back end of the document P fits in the document mounting section 11 is made smaller than the first threshold value Sz1 to be applied when the back end of the document P protrudes from the document mounting section 11. Accordingly, it is possible to suppress excessive skipping of detection of a feeding abnormality using the two-dimensional sensor 36. As a result, it is possible to suitably detect a feeding abnormality. In this regard, it is possible to obtain the feeding direction size of the document P by the two-dimensional sensor 36 or the first document detection section 31, and the like. Also, when a user has specified a document size in the driver settings, it is possible to use that information.

Also, when the document P has a size such that the back end of the document P protrudes from the document mounting section 11, the document P is said to be more difficult to rise from the two-dimensional sensor 36 as the protrusion amount of the document back end from the document mounting section 11 is smaller. Thus, it is suitable that the first threshold value Sz1 to be applied when the feeding direction size of the document P is a first size is made smaller than the first threshold value Sz1 to be applied when the feeding direction size is a second size larger than the first size. Thereby, it is possible to suppress excessive skipping of detection of a feeding abnormality using the two-dimensional sensor 36. As a result, it is possible to suitably detect a feeding abnormality.

Also, the first threshold value Sz1 described above may differ depending on the size of the document P in the X-axis direction, that is to say, the width direction size. Specifically, the first threshold value Sz1 to be applied when the width direction size of the document P is a first size is made lower than a case in which the first threshold value Sz1 is a second size smaller than the first size. That is to say, as the width direction size of the document P is larger, the document P becomes heavier. Accordingly, the document P becomes more different to rise from the two-dimensional sensor 36. In view of these characteristics, the first threshold value Sz1 to be applied when the width direction size of the document P is the first size is made lower than the first threshold value Sz1 to be applied when the width direction size is the second size smaller than the first size. Thereby, it is possible to suppress excessive skipping of detection of a feeding abnormality using the two-dimensional sensor 36 (step S106 in FIG. 7 and step S205 in FIG. 10). As a result, it is possible to suitably detect a feeding abnormality. In this regard, it is possible to obtain the X-axis direction size of the document P by an image read by the reading section 20, by disposing a detection unit that detects the positions of the edge guides 12A and 12B, or by disposing another dedicated detection unit. Also, when a user has specified a document size in the driver settings, it is possible to use that information.

The present disclosure is not limited to the embodiments described above. Various variations are possible within the scope of the appended claims. It goes without saying that such variations are also included in the scope of the present disclosure.

What is claimed is:

1. A medium feeding apparatus comprising:
   a medium mounting section forming a mounting face for mounting a medium thereon;
   a feeding roller configured to feed a lowermost medium among mediums mounted on the medium mounting section in a feeding direction;
   a movement detection unit disposed, at a position opposing the lowermost medium among the mediums mounted on the medium mounting section, upstream of the feeding roller in the feeding direction and configured to output information related to movement of the medium in a direction along the mounting face; and
   a control unit configured to perform abnormality detection processing for determining a feeding abnormality when movement of the medium after starting feeding the medium exceeds a permissible range based on information obtained from the movement detection unit, wherein
   a medium height detection unit that outputs information related to a height of the medium mounted on the medium mounting section from the mounting face is disposed,
   when the height is less than a first threshold value based on detection information detected by the medium height detection unit in the abnormality detection processing, the control unit continues feeding the medium regardless of detection information detected by the movement detection unit or without obtaining detection information detected by the movement detection unit,
   the first threshold value differs depending on a size of the medium in the feeding direction, and
   the first threshold value to be applied when a back end of the medium in the feeding direction has a size that fits in the medium mounting section is lower than the first threshold value to be applied on the back end of the medium in the feeding direction has a size that is out of the medium mounting section.

2. The medium feeding apparatus according to claim 1, wherein
   when the control unit starts feeding a medium, the control unit obtains an initial value of the height based on detection information detected by the medium height detection unit, and
   when a variation from the initial value of the height exceeds a second threshold value, the control unit stops feeding the medium based on the detection information detected by the medium height detection unit in the abnormality detection processing.

3. The medium feeding apparatus according to claim 1, wherein
   when the height exceeds a second threshold value higher than the first threshold value, the control unit stops feeding the medium based on detection information detected by the medium height detection unit in the abnormality detection processing.

4. The medium feeding apparatus according to claim 1, wherein
the movement detection unit includes a two-dimensional sensor that outputs information related to movement of the medium in a first direction being a direction along the feeding direction and in a second direction being a direction intersecting the feeding direction.

5. The medium feeding apparatus according to claim 1, wherein
the height detection unit includes a distance measurement sensor that measures a distance to a medium positioned uppermost among the mediums mounted on the medium mounting section.

6. An image reading apparatus comprising:
a reading unit that reads a medium; and
the medium feeding apparatus according to claim 1, the medium feeding apparatus feeding the medium to the reading unit.

7. A medium feeding apparatus comprising:
a medium mounting section forming a mounting face for mounting a medium thereon;
a feeding roller configured to feed a lowermost medium among mediums mounted on the medium mounting section in a feeding direction;
a movement detection unit disposed, at a position opposing the lowermost medium among the mediums mounted on the medium mounting section, upstream of the feeding roller in the feeding direction and configured to output information related to movement of the medium in a direction along the mounting face; and
a control unit configured to perform abnormality detection processing for determining a feeding abnormality when movement of the medium after starting feeding the medium exceeds a permissible range based on information obtained from the movement detection unit, wherein
a medium height detection unit that outputs information related to a height of the medium mounted on the medium mounting section from the mounting face is disposed,
when the height is less than a first threshold value based on detection information detected by the medium height detection unit in the abnormality detection processing, the control unit continues feeding the medium regardless of detection information detected by the movement detection unit or without obtaining detection information detected by the movement detection unit,
the first threshold value differs depending on a size of the medium in the feeding direction, and
when a back end of the medium in the feeding direction is out of the medium mounting section, the first threshold value to be applied when the size of the medium in the feeding direction is a first size is lower than the first threshold value to be applied when the size of the medium in the feeding direction is a second size larger than the first size.

8. A medium feeding apparatus comprising:
a medium mounting section forming a mounting face for mounting a medium thereon;
feeding roller configured to feed a lowermost medium among mediums mounted on the medium mounting section in a feeding direction;
a movement detection unit disposed, at a position opposing the lowermost medium among the mediums mounted on the medium mounting section, upstream of the feeding roller in the feeding direction and configured to output information related to movement of the medium in a direction along the mounting face; and
a control unit configured to perform abnormality detection processing for determining a feeding abnormality when movement of the medium after starting feeding the medium exceeds a permissible range based on information obtained from the movement detection unit, wherein
a medium height detection unit that outputs information related to a height of the medium mounted on the medium mounting section from the mounting face is disposed,
when the height is less than a first threshold value based on detection information detected by the medium height unit in the abnormality detection processing, the control unit continues feeding the medium regardless of detection information detected by the movement detection unit or without obtaining detection information detected by the movement detection unit,
the first threshold value differs depending on a size of the medium in a width direction being a direction intersecting the feeding direction, and
the first threshold value to be applied when a size of the medium in the width direction is a first size is smaller than the first threshold value to be applied when the size of the medium in the width direction is a second size smaller than the first size.

\* \* \* \* \*